United States Patent
Rolland et al.

(10) Patent No.: US 8,308,861 B2
(45) Date of Patent: Nov. 13, 2012

(54) PHASE CHANGE MATERIAL COMPOSITIONS

(75) Inventors: Loic Pierre Rolland, Divonne les Bains (FR); Jacques Andre, Lucinges (FR)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/076,852

(22) Filed: Mar. 31, 2011

(65) Prior Publication Data

US 2011/0281485 A1    Nov. 17, 2011

Related U.S. Application Data

(60) Provisional application No. 61/334,383, filed on May 13, 2010.

(51) Int. Cl.
| | |
|---|---|
| C09D 13/00 | (2006.01) |
| C09K 3/22 | (2006.01) |
| B32B 3/28 | (2006.01) |
| A01K 1/015 | (2006.01) |
| D04H 1/00 | (2006.01) |
| B32B 27/00 | (2006.01) |

(52) U.S. Cl. .................. 106/31.35; 106/31.3; 252/88.2; 252/70; 428/292.1; 428/221; 428/513; 442/181

(58) Field of Classification Search ........................ None
See application file for complete search history.

(56) References Cited

U.S. PATENT DOCUMENTS

| | | | |
|---|---|---|---|
| 4,003,426 A | 1/1977 | Best | |
| 4,528,328 A | 7/1985 | Ranade | |
| 4,797,160 A | 1/1989 | Salyer | |
| 4,988,543 A | 1/1991 | Houle | |
| 5,053,446 A | 10/1991 | Salyer | |
| 5,191,004 A | 3/1993 | Maringer et al. | |
| 5,349,798 A | 9/1994 | Gross | |
| RE34,880 E * | 3/1995 | Salyer | 106/660 |
| 5,565,132 A | 10/1996 | Salyer | |
| 5,755,216 A | 5/1998 | Salyer | |
| 6,412,545 B1 | 7/2002 | Buff | |
| 6,482,332 B1 | 11/2002 | Malach | |
| 6,869,441 B2 * | 3/2005 | Agarwal et al. | 607/114 |
| 7,241,509 B2 | 7/2007 | Pause | |
| 2006/0124892 A1 | 6/2006 | Rolland et al. | |

FOREIGN PATENT DOCUMENTS

| | | |
|---|---|---|
| WO | 9639473 A2 | 12/1996 |
| WO | 9804644 A1 | 5/1998 |
| WO | 2004044345 A2 | 5/2004 |
| WO | 2006062610 A2 | 6/2006 |

* cited by examiner

*Primary Examiner* — Camie Thompson

(57) ABSTRACT

A phase change material (PCM) composition comprises a blend of at least one fatty acid ester and at least one ethylene copolymer, wherein the ethylene copolymer comprises at least 28% of an at least one polar comonomer by weight, based on the weight of the ethylene copolymer. A film or sheet comprises or is produced from the PCM composition and the film or sheet can be a single layer or multilayer structure.

20 Claims, No Drawings

PHASE CHANGE MATERIAL COMPOSITIONS

This application claims the benefit of U.S. Provisional Application No. 61/334,383, filed May 13, 2010, now pending, the entire disclosure of which is incorporated herein by reference.

The invention relates to phase change material compositions comprising ethylene copolymers and to the use of the compositions.

BACKGROUND OF THE INVENTION

In the building industry, there is a continuous need to decrease the energy costs related to heating and cooling indoor rooms. One of the key factors that improve the energy management is insulation layers, which come in different physical forms, such as stone wool, polymeric foams or different fibers. The insulation layer inhibits the heat transfer from inside to outside or, alternatively, from outside to inside and thus either keeps the interior warm in cold weather conditions or, alternatively, cold in hot weather conditions.

In recent years, new kinds of building materials have been used for managing the thermal efficiency of buildings. These new materials are based on phase change materials (PCMs). A PCM is latent thermal storage material using chemical bonds to store and release heat, which is capable of absorbing and releasing high amounts of latent heat during melting and crystallization, respectively.

During a hot day, for example, a solid PCM may gradually melt, thereby absorbing the thermal energy that would otherwise have had heated up the building. During the ensuing colder night, the previously molten PCM re-solidifies (or crystallizes), thereby releasing the thermal energy absorbed during the day and so heating the building up at night.

Phase change materials can be organic or inorganic substances, and paraffins and vegetable oils and/or fats are frequently used as organic PCMs because of their low cost and toxicity.

PCM can be introduced in matrices made of different materials or applied to a coating. See, e.g., U.S. Pat. Nos. 4,003,426, 4,528,328, 5,053,446, US20060124892 (WO2006/062610), WO98/04644, and WO2004/044345.

In order to conveniently use the PCMs in building applications, the PCMs have been so far incorporated into matrix polymers that absorb and retain the phase change materials, even at temperatures above the melting point of the PCMs, thus making it possible to manufacture the resulting PCMs composite materials into slabs, panels or other shapes that are easily mounted in a wall. However, most matrix polymers suffer from multiple drawbacks such as limited PCM absorption capacity, substantial loss of PCM by exudation during lifetime, and an increase in brittleness of the matrix polymer upon PCM absorption. A solution to the above problems has been proposed in WO2006062610A2.

Nowadays, there is a strong trend towards renewable materials that have a low environmental impact, and the building sector is no exception. It therefore does not come as a surprise that manufacturers of building material have developed different PCM composite materials where the fossil fuel-based materials are replaced by renewable and/or biological materials.

U.S. Pat. No. 6,574,971 discloses a method for sourcing PCMs from vegetal oil or animal fats instead of from fossil fuel.

However, these PCMs can suffer from several drawbacks when incorporated in polymeric matrices, such as, for example, their tendency to supercool.

Supercooling, also known as undercooling, occurs when a liquid is cooled below its melting point without becoming solid.

In PCMs, whose thermal effect is almost entirely based on the energy absorbed or released during the phase change between liquid and solid, supercooling is a very undesirable property.

An unwanted situation arises when, for example, after having absorbed heat during a first day and having changed from solid to liquid, the PCM cools down to a temperature that is below its melting point during the night without solidifying. On the second day, the supercooled PCM may already be in the liquid state because of supercooling and may thus be unable to absorb appreciable quantities of heat by PCM from solid to liquid. This may lead to poor thermal performance during the second day.

In the context of the invention, the temperature at which the PCM solidifies upon supercooling and which is below the melting temperature is called the crystallization temperature ($T_C$).

Some PCMs suffer more than others from supercooling. For example, pure paraffin suffers less from supercooling as described in U.S. Pat. No. 6,765,031 than PCMs based on vegetal oils and/or animal fats. Because paraffin is based on non-renewable fossil fuels, it is less preferred in compositions that need to source the phase change materials from renewable sources.

There is therefore a need to provide a composite material that comprises a maximum of renewably sourced materials, in particular renewably sourced PCMs, but does not suffer from insufficient PCM absorption and where the tendency of PCMs to supercool is at least partially or entirely prevented.

SUMMARY OF THE INVENTION

The above problems can be overcome by a phase change material (PCM) composition comprising or produced from a PCM and at least one ethylene copolymer, wherein the PCM can be, for example, selected from the group consisting of alkane, fatty acid, fatty alcohol, fatty acid ester, fatty acid amide, salts of fatty acid, and combinations of two or more thereof, and the ethylene copolymer comprises or is produced from repeat units derived from ethylene and at least one polar comonomer selected from the group consisting of vinyl acetate, acrylic acid, methacrylic acid, acrylic acid ester, methacrylic acid ester, carbon monoxide, and combinations of two or more thereof.

A film or sheet comprises or is produced from a PCM composition that can be the same as disclosed above and the film or sheet can be a single layer or multilayer structure. A multilayer structure can comprise at least one such film or sheet and, optionally further comprises at least one layer adjacent to said sheet, The invention also includes the use of an ethylene copolymer to prevent supercooling in compositions comprising at least one PCM and at least one ethylene copolymer, wherein the ethylene copolymer comprises at least 28%, or 28 to 80%, polar comonomer by weight, based on the weight of the at least one ethylene copolymer.

DETAILED DESCRIPTION OF THE INVENTION

Throughout the present application, weight percentages are given based on the total weight of the composition or ethylene acid copolymer, unless otherwise defined.

The term "blend" of A and B refers to a mixture comprising A and B and may be interchangeably used with "composition".

The term "produced from" is an open-ended term meaning that it does not exclude any elements that are not disclosed or recited. For example, when a multilayer structure is produced from a sealant layer and a barrier layer, the structure may comprise additional layer(s). What follows the verb "is" may be a definition.

All references disclosed are incorporated herein by reference.

The phase change material (PCM) composition comprises or is produced from a blend of at least one PCM and at least one matrix polymer.

The at least one PCM may be chosen from alkanes (e.g., hydrocarbons), fatty acids, fatty alcohols, fatty acid esters, fatty acid amides, salts of fatty acids, and/or combinations of two or more thereof. The PCM can preferably be chosen from fatty acids, fatty acid esters, salts of fatty acids, and/or combinations of two or more thereof. They can have an origin derived from animal fat, animal grease, vegetable oil, vegetable wax, and/or combinations of two or more thereof.

The fatty acids can be "long" chain fatty acids, both saturated and unsaturated, having tails of more than 12 carbons. Examples of such fatty acids include naturally occurring triglycerides, oleic acid, palmitic acid, linoleic acid, palmitoleic acid, stearic acid, or combinations of two or more thereof. Frequently available fatty acids can be oleic acid, palmitic acid, linoleic acid, palmitoleic acid, stearic acid, hydrates or hydrogenated acids of any of the preceding acids, and/or combinations of two or more thereof. Details of such renewable PCM are disclosed in U.S. Pat. No. 6,574,971, the disclosure of which is incorporated herein by reference.

The fatty acid esters can be formed with alcohols, diols, and/or polyols, including, but not limited to, mono-, di- or triglycerides of glycerol, esters of pentaerythritol, polyesters of polyhydric alcohols, esters of methanol, ethanol, propanol, butanol, isobutanol, pentanol, hexanol, cyclohexanol, esters or diesters of ethylene glycol and/or combinations of two or more thereof. Preferably, the fatty acid esters are mono-, di- or triglycerides of glycerol, and/or combinations thereof.

The fatty acids, fatty alcohols, fatty acid esters, fatty acid amides, or salts of fatty acids disclosed above can derived from renewable sources such as animal fat sources (e.g., pork or beef tallow), poultry fat sources, soybean oil, rapeseed oil, peanut oil, vegetable oil, yellow grease, or combinations of two or more thereof.

When manufacturing compositions comprising PCM, the amount of PCM absorbed in the ethylene copolymer matrix is desirably as high as possible, because the thermal performance of the compositions may be directly proportional to the concentration of PCM contained in the composition.

The ethylene copolymer, which may be sourced from renewable or petrochemical sources, comprises or is produced from repeat units derived from ethylene and at least one polar comonomer which can be vinyl acetate, acrylic acid, methacrylic acid, acrylic acid ester, methacrylic acid ester, carbon monoxide, or combinations of two or more thereof such as vinyl acetate, alkyl acrylates, alkyl methacrylates, carbon monoxide, and/or combinations of two or more thereof. Preferably, the polar comonomer is vinyl acetate, butyl acrylate, ethyl acrylate, methyl acrylate, and/or combinations of two or more thereof. Most preferably, the at least one polar comonomer is vinyl acetate.

The ethylene copolymer can be a copolymer of ethylene and at least about 28 wt %, preferably of from 28 wt % to 80 wt %, more preferably of from 30 wt % to 60 wt %, most preferably of from 35 wt % to 50 wt %, polar comonomer by weight, based on the weight of the ethylene copolymer.

The ethylene monomer may be sourced from renewable sources such as for example wheat, corn or sugarcane ethanol which can be produced by fermentation and wherein the ethanol is subsequently subjected to a dehydration step to yield ethylene monomer.

The polar comonomer may be obtained from renewably sourced ethylene, and for example, EVA may be obtained from a reaction of ethylene, oxygen and acetic acid, all of which can be sourced renewably.

Examples of ethylene copolymers include, but are not limited to, ethylene vinyl acetate copolymer (EVA), ethylene/(meth)acrylate copolymers, ethylene/alkyl (meth)acrylate copolymers, ethylene/(meth)acrylic acid copolymers, ethylene/alkyl (meth)acrylic acid copolymers, ethylene/vinyl acetate/CO copolymers, ethylene/acrylic ester/CO copolymers, and/or or combinations of two or more thereof.

EVA includes copolymers derived from the copolymerization of ethylene and vinyl acetate or the copolymerization of ethylene, vinyl acetate, and an additional comonomer. An EVA may have a melt flow rate, measured in accordance with ASTM D-1238, of from 0.1 to 60 g/10 or 0.3 to 30 g/10 minutes. A mixture of two or more different EVAs may be used.

Ethylene acid copolymers may be produced by any methods known to one skilled in the art such as use of "co-solvent technology" disclosed in U.S. Pat. No. 5,028,674.

Specific acid copolymers include ethylene/acrylic acid dipolymers, ethylene/methacrylic acid dipolymers, and ethylene/acrylic acid/n-butyl acrylate, ethylene/methacrylic acid/n-butyl methacrylate, ethylene/acrylic acid/iso-butyl acrylate, ethylene/methacrylic acid/iso-butyl methacrylate, ethylene/acrylic acid/methyl acrylate, ethylene/methacrylic acid/methyl methacrylate, ethylene/acrylic acid/ethyl acrylate and ethylene/methacrylic acid/ethyl methacrylate terpolymers, or combinations of two or more thereof. An ethylene/methacrylic acid dipolymer of note comprises 19 weight % of copolymerized units of methacrylic acid.

Ionomers are obtained by neutralization of an acid copolymer. Neutralizing agents including metal cations such as sodium or potassium ions are used to neutralize at least some portion of the acidic groups in the acid copolymer. Unmodified ionomers are prepared from the acid copolymers such as those disclosed in U.S. Pat. No. 3,262,272.

Ethylene/alkyl (meth)acrylate copolymer includes copolymers of ethylene and one or more $C_{1-8}$ alkyl (meth)acrylates. Examples of alkyl (meth)acrylates include methyl acrylate, ethyl acrylate and butyl acrylate. Examples of the copolymers include ethylene/methyl acrylate copolymer ethylene/ethyl acrylate copolymer, ethylene/butyl acrylate copolymer, or combinations of two or more thereof.

Ethylene/alkyl (meth)acrylate copolymers may be prepared by processes well known to one skilled in the art using either autoclave or tubular reactors. See, e.g., U.S. Pat. Nos. 2,897,183, 3,404,134, 5,028,674, 6,500,888, and 6,518,365. Because the methods for making an ethylene/alkyl (meth) acrylate copolymer are well known, the description of which is omitted herein for the interest of brevity. Tubular reactor produced ethylene/alkyl (meth)acrylate copolymers are commercially available from E.I. du Pont de Nemours and Company, Wilmington, Del. (DuPont) such as ELVALOY® AC. The ethylene/alkyl (meth)acrylate copolymers may vary significantly in molecular weight and the selection of the melt index (MI) grade of polymer may be made by balancing the properties of the ethylene/alkyl (meth)acrylate copolymer with those of the neutralized organic acid and ethylene acid copolymer to provide the desired mix of permeability and structural properties needed for a specific variable permeability construction. A mixture of two or more different ethylene/alkyl (meth)acrylate copolymers may be used.

The PCM can be blended with a polymer matrix as disclosed in WO2006/062610 (or US20060124892), the disclosure of which is incorporated herein by reference. The blend of PCM and polymer matrix can comprise, based on the total weight of the blend, at least 30 wt %, about 30 to about 70 wt %, or about 40 to about 60 wt %, of a PCM and the balance being one or more polymers disclosed herein.

The blend of PCM and polymer can be produced by any means known to one skilled in the art. For example, a blend of PCM and polymer matrix can be produced by soaking different component(s) all together at temperatures which are slightly above the melting point of the PCM but below the melting point of the one or more polymers. Soaking is a natural absorption of the molten PCM by the polymer(s). The components can be mixed together in a tumble blender during a certain period of time which can vary in function of the rotational speed of the tumble blender itself for a sufficient period of time such as 1 to 10 hours or about 8 hours.

The blend of PCM and polymer can also be produced by melt blend extrusion whereby the components are blended at temperatures above the melting point of both the one or more polymers and the PCM, the thus obtained mixture being subsequently extruded into granules or directly into sheets or any other suitable form.

The PCM composition may additionally comprise from 0.01 to 15, 0.01 to 10, or 0.01 to 5, weight % of additives including plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. These additives are described in the Kirk Othmer *Encyclopedia of Chemical Technology*.

The additives may be incorporated into the composition by any known process such as by dry blending, extruding a mixture of the various constituents, the conventional masterbatch technique, or the like.

The PCM composition can further comprise a fire retardant such as a chemical additive including, but not limited to, phosphorous compounds, antimony oxides, and halogen compounds, particularly bromine compounds, and others well known in the art. A loading of such additives can be between 20 to 30, or about 25% (of the final air-dried composition or air-dried film weight).

Furthermore, the PCM composition can comprise at least one PCM-absorbing material, such as wood chips, saw dust, wood pulp, cellulose, bark material, starch, clay, diatomaceous earth, zeolites, talc, sodium stearate, cat litter, and/or combinations of two or more thereof.

Preferably, the PCM-absorbing material is a bark material, which can be chosen from the outermost layers of stems and roots of woody plants, such as trees, woody vines and shrubs. More preferably, the PCM-absorbing material can be chosen from the outermost layers of stems and roots of a plant of the genus *Quercus* and most preferably is cork from the cork oak *Quercus suber*.

The outermost layers of stems and roots of the cork oak are particularly high in suberin, a hydrophobic substance that prevents the loss of water and nutrients in plants.

PCM-absorbing materials derived from heart wood, for example wood chips or saw dust, which are composed mainly of lignin and cellulose and which contain virtually no suberin, absorb smaller amounts of phase change material when compared to materials comprising suberin, such as bark.

The PCM composition according to the present invention can comprise at least about 0.01 wt %, preferably from about 0.01 to about 5 wt %, of the at least one phase change material absorbing material, based on the total weight of the composition.

Supercooling is the phenomenon, also known as undercooling, that occurs when a liquid is cooled below its melting point without becoming solid.

Different matrix polymers may give rise to different supercooling behaviors for the same PCM.

Therefore, matrix polymers that allow to minimize the difference between theoretical solidification temperatures and the observed solidification temperatures are desirable to enhance the thermal efficiency of the PCM composition.

Where the polymer matrix is an ethylene copolymer, increasing the amount of polar comonomer in the ethylene copolymer may allow to entirely or partially prevent supercooling of the PCM in blends of ethylene copolymer and phase change material. That is, the increase in polar comonomer in the ethylene copolymer matrix polymer may decrease the difference between the melting temperature and the observed crystallization temperature of the PCM in the blend of ethylene copolymer and PCM.

Therefore, the composition allows to partially or entirely solve the encountered supercooling problem by providing a blend of at least one phase change material and at least one ethylene copolymer, wherein the ethylene copolymer comprises from 28 wt % to 80 wt % polar comonomer by weight, based on the weight of the ethylene copolymer. Preferably, the at least one ethylene copolymer according to the present invention comprises from 30 wt % to 60 wt %, most preferably from 35 wt % to 50 wt % polar comonomer.

The polymer matrix of the PCM composition may be cross-linked after the PCM has been incorporated into it by means of any method known in the art like for example by using cross-linking agents based on silane and/or peroxide groups. In the crosslinking process, it may be undesirable crosslinking the PCM. This is possible, for example, by grafting silane groups onto the polymer molecules prior to incorporating the phase change material. Such grafting can occur by means of conventional techniques, such as by extruding the polymer at temperatures above 150° C. after adding 0.2 to 2 wt % of vinyl-tri-methoxy-silane or vinyl-tri-ethoxy-silane together with 0.05 to 0.5 wt % peroxide. The PCM can then be incorporated into the silane-grafted polymer and the resulting blend can be cross-linked, in presence of water or water moisture, by using catalysts like dibutyl-tin-laureate. Such crosslinking of the polymer matrix enables to increase the mechanical and thermal properties of the composition itself when used in the different applications listed below, as well as to enhance its processability during manufacturing.

The polymer matrix of the PCM composition may also be cross-linked by irradiation methods well known in the art.

Furthermore, the polymer matrix of the PCM composition may be grafted with other suitable grafting agents, to increase adhesion to metallic materials. Suitable grafting agents may be chosen among agents such as ethylenically unsaturated organic acids and their esters, half-esters and anhydrides such as for example maleic anhydride, alkyl hydrogen maleate, maleic acid, fumaric acid, alkyl hydrogen fumarate, and/or combinations thereof, which may be present of from 0.1 weight percent to 2.5 weight percent, preferably of from 0.8 to 1.8 wt percent, based on the total weight of the polymer matrix. The same or higher amounts of grafting agent may be accomplished by adding the ethylenically unsaturated grafting agents during the polymerization step of the matrix.

A film or sheet may be produced from the PCM composition by any means known to one skilled in the art such as, for example, extrusion, casting, coextrusion, extrusion coating, lamination, or any other known means which is well known to one skilled in the art and the description of which is omitted herein for the interest of brevity.

A sheet may have one or more layers including "inner layer" and/or "internal layer" (any layer, of a multilayer film, having both of its principal surfaces directly adhered to another layer of the film) and an "outer layer" (any film layer having less than two of its principal surfaces directly adhered to another layer of the film). All multilayer films have two, and only two, outer layers, each of which has a principal surface adhered to only one other layer of the multilayer film. The outermost layers of stems and roots of the cork oak are particularly high in suberin, a hydrophobic substance that prevents the loss of water and nutrients in plants.

For example, a multilayer structure can comprise at least one sheet (A) of the above PCM composition, which is adjacent to at least one layer (B). Preferably, such sheet (A) is positioned between two layers (B1,B2). One of the functions of the at least one layer (B), or preferably of two layers (B1,B2) is to help keep the PCM material of the sheet (A) within the polymer matrix, thus enabling to maintain the heat management performance of the PCM sheet (A) at a high level over a long period of time. Furthermore, undesired grease stains on the surfaces adjacent to the PCM composition are hereby avoided. The multilayer structure can be manufactured by extrusion coating the PCM material layer (A) onto the at least one layer (B), extrusion laminating the PCM material between two of such layers (B1, B2), and co-extruding the PCM material with the at least one layer (B) if the material of such at least one layer (B) makes it possible (for example if the at least one layer is made of a flame retardant composition).

The multilayer structure may further comprise one or more additional layers (C) positioned adjacent and externally to one or more of the layers (B1, B2).

Also for example, a multilayer structure can comprise in the following sequence: a) at least one sheet (A); b) at least one layer (B) positioned adjacent to the at least one sheet (A); c) one or more additional layers (C) positioned adjacent to the at least one layer (B). The multilayer structure may further comprise one or more additional layers (C) positioned adjacent and externally to one or more of the layers (B1, B2). Layer (B) and/or layer (C) can also have the function of conferring to the overall multilayer structure improved fire retardancy and/or heat conductivity so that heat is easily conveyed through such at least one layer to the PCM composition and vice versa.

Layer (B), (B1), (B2), or (C) can be a metal layer or a metallized film layer. The metal can be aluminum, copper, zinc, iron, or combinations of two or more thereof. Aluminum foil (Al) is used extensively in the food packaging industry as a moisture and gas barrier. Aluminum, especially aluminum foil, can be a convenient metal layer.

Metallized films are thermoplastic films having deposited (e.g., by vacuum) thereon a layer of metal such as aluminum. Metallized films can comprise polyesters (such as polyethylene terephthalate, polypropylene terephthalate, polybutylene terephthalate) or polypropylene as the thermoplastic film component. Polyethylene is also sometimes metallized. Often, metallized films are combined with other materials such as polyethylene, oriented polypropylene, oriented polyethylene terephthalate, paper, or paperboard in multilayer structures. Because a process for making metallized film is well known in the art, the description of which is omitted herein for the interest of brevity.

For example, aluminum or aluminum-coated film can be used with the PCM-containing film or sheet with the aluminum side facing the PCM sheet (A) to achieve optimum adhesion.

Additionally, layers containing flame retardant polymer compositions (polymers filled with flame retardant inorganic fillers like aluminum trihydrate, ammonium polyphosphate, magnesium hydroxide, calcium carbonate, brominated fillers and melamine pyrophosphate) can also be used with a PCM sheet. Examples of such multilayer films or sheets can include plaster (plaster boards and panels, gypsum boards), rockwool insulation, glass-wool insulation, foamed polystyrene, wood panel, dry wall, and other materials conventionally used in the construction industry. The layer (B) and layer (C) may have a thickness varying from 5 μm up to 20 cm in accordance with the materials used. Aluminum layers, for example, may have thicknesses varying from 10 to 600 μm, preferably from 80 to 200 μm and, still more preferably, of about 128 μm.

Also disclosed is a molded article comprising or made of a PCM composition. Such molded part can be manufactured by any process suitable for transforming thermoplastic materials including injection molding, blow molding, and thermoforming.

The PCM sheet (A) can have a thickness varying between 1 μm and 500 μm or 1 mm and 6 mm and can be manufactured either directly by method such as melt blend extrusion described above, or alternatively by preparing the PCM composition in advance, and subsequently processed by means of any conventional technology based on extrusion, calendaring and hot lamination.

The PCM composition also can be used in several applications where thermal management is needed. While temperature management inside buildings is one of the most relevant applications, the PCM composition of the present invention may also be used in automotive applications (for example in the ceiling, seats and tires of vehicles); air filters in air ducts; air conditioners; transportation applications; food packaging (to keep food chilled or warm); medical packaging (for example organ or vaccine transportation); woven and nonwoven fabrics for garments, clothes and sport wear; footwear; tree wraps, hand grips (in tools, sporting goods and vehicles); bedding; carpets; wood composites; electric cables and plastic tubes for hot media including water.

The composition can also be coated directly on a substrate using impregnation and coating techniques. For example, the PCM composition can be a coating applied directly on the substrate (via extrusion coating, spraying, painting, or other appropriate application methods). Such coating can also be applied using spreading methods known in the art such as with a rubber doctor blade or with a slit extrusion machine.

The PCM composition may be formed at least partially in the substrate by impregnating the substrate with the composition by applying the molten composition to the substrate and then cooling the composition while it is in contact with the pores of the substrate.

The composition can be applied to one side or both sides of a substrate. In the case where the substrate is coated or laminated on one side, the composition may be applied to the side.

Alternatively, a sheet of the PCM composition can be applied, laminated, adhered, or coated onto a substrate by, for example, extrusion coating, spraying, painting, or other appropriate application methods.

The substrate may be any material providing support, shape, esthetic effect, protection, surface texture, bulk volume, weight, or combinations of two or more thereof to enhance the functionality and handability of the structure. Examples of substrates include particle board, chip board, oriented strand board, plywood paneling, gypsum board, fiber reinforced gypsum board, fiber board, cement board, cementitious wood wool board, calcium silica board, fiber insulation batts or slabs, foam insulation slabs, nonwoven textiles, fiber-reinforced cellulose, paper, cloth, metallic or non-metallic foils, or combinations of two or more thereof.

The PCM composition or a film or sheet thereof can be applied between the interior sheathing and the insulating material in a wall, ceiling and/or roof of a building, or be used with metal roofs or timber post constructions and can also lead to a reduction in building costs along with an improvement in temperature control. The PCM composition or a film or sheet thereof can be a film that can be applied as part of the wall, ceiling or roof construction of a building (e.g., the film may be attached to the framing members so that the film is between the insulating material and the interior sheathing).

Cellulose materials such as paper webs (for example Kraft paper), membranes made from synthetic fiber spun fabrics such as nonwoven textiles, or even perforated films having large percentages of open areas such as perforated polyethylene films, may be also used as substrate. These carrier materials may be reinforced with fibers. An example for use is applied as a coating or film onto a construction material such as TYVEK®, commercially available from E.I. du Pont de Nemours and Company, Wilmington, Del., USA, for construction for temperature control of a building.

EXAMPLES

Absorption of Phase Change Material

Samples were prepared by mixing a same PCM with different matrix polymers having varying amounts of vinyl acetate monomer.

For sample 1 (Comparative), 27 g of LLDPE (linear low density polyethylene) pellets commercially available from Dow (Midland, USA) under the trademark DOWLEX® 2740, were mixed with 33 g of renewably sourced PCM (a fatty acid derivative mixture; see also U.S. Pat. No. 6,574,971) having a melting temperature of 23° C. and a latent heat of fusion of 208 J/g, commercially available from Entropy Solutions (Minneapolis, USA) under the trademark PURETEMP. The LLDPE was allowed to soak up the molten phase change material for 48 hours at 23° C. in a Type IKA KA260 control shaker operating at a frequency of 5 Hz. Then, the amount of absorbed phase change material was determined by weighting the pellets and dividing the weight of the pellets by the sum of the initial weight of the pellets (27 g) and the phase change material (33 g). Results are shown in Table 1.

For sample 2, 27 g of ethylene vinyl acetate pellets, commercially available from DuPont de Nemours (Wilmington, USA) under the trademark ELVAX® 3120, having an vinyl acetate content of 7.5 wt %, were mixed with 33 g of renewably sourced PCM (a fatty acid derivative mixture; see also U.S. Pat. No. 6,574,971) having a melting temperature of 23° C. and a latent heat of fusion of 208 J/g, commercially available from Entropy Solutions (Minneapolis, USA) under the trademark PURETEMP. The ethylene vinyl acetate was allowed to soak up the molten phase change material for 48 hours at 23° C. in a Type IKA KA260 control shaker operating at a frequency of 5 Hz. Then, the amount of absorbed phase change material was determined by weighting the pellets and dividing the weight of the pellets by the sum of the initial weight of the pellets (27 g) and the phase change material (33 g). Results are shown in Table 1.

For sample 3, 27 g of ethylene vinyl acetate pellets, commercially available from DuPont de Nemours (Wilmington, USA) under the trademark ELVAX® 3170, having an vinyl acetate content of 18 wt %, were mixed with 33 g of renewably sourced PCM (a fatty acid derivative mixture; see also U.S. Pat. No. 6,574,971) having a melting temperature of 23° C. and a latent heat of fusion of 208 J/g, commercially available from Entropy Solutions (Minneapolis, USA) under the trademark PURETEMP. The ethylene vinyl acetate was allowed to soak up the molten phase change material for 24 hours at 23° C. in a Type IKA KA260 control shaker operating at a frequency of 5 Hz. Then, the amount of absorbed phase change material was determined by weighting the pellets and dividing the weight of the pellets by the sum of the initial weight of the pellets (27 g) and the phase change material (33 g). Results are shown in Table 1.

For sample 4, 27 g of ethylene vinyl acetate pellets, commercially available from DuPont de Nemours (Wilmington, USA) under the trademark ELVAX® 265, having an vinyl acetate content of 28 wt %, were mixed with 33 g of renewably sourced PCM a fatty acid derivative mixture; see also U.S. Pat. No. 6,574,971) having a melting temperature of 23° C. and a latent heat of fusion of 208 J/g, commercially available from Entropy Solutions (Minneapolis, USA) under the trademark PURETEMP. The ethylene vinyl acetate was allowed to soak up the molten phase change material for 48 hours at 23° C. in a Type IKA KA260 control shaker operating at a frequency of 5 Hz. Then, the amount of absorbed phase change material was determined by weighting the pellets and dividing the weight of the pellets by the sum of the initial weight of the pellets (27 g) and the phase change material (33 g). Results are shown in Table 1.

For sample 5, 27 g of ethylene vinyl acetate pellets, commercially available from DuPont de Nemours (Wilmington, USA) under the trademark ELVAX® 40L03, having an vinyl acetate content of 40 wt %, were mixed with 33 g of renewably sourced PCM (a fatty acid derivative mixture; see also U.S. Pat. No. 6,574,971) having a melting temperature of 23° C. and a latent heat of fusion of 208 J/g, commercially available from Entropy Solutions (Minneapolis, USA) under the trademark PURETEMP. The ethylene vinyl acetate was allowed to soak up the molten phase change material for 48 hours at 23° C. in a Type IKA KA260 control shaker operating at a frequency of 5 Hz. Then, the amount of absorbed phase change material was determined by weighting the pellets and dividing the weight of the pellets by the sum of the initial weight of the pellets (27 g) and the phase change material (33 g). Results are shown in Table 1.

TABLE 1

| Sample | 1 (Comparative) | 2 | 3 | 4 | 5 |
|---|---|---|---|---|---|
| Vinyl Acetate (%) | 0 | 7.5 | 18 | 28 | 40 |
| Absorption | 0.45 | 0.46 | 0.49 | 0.54 | 0.89 |

Table 1 shows that increasing vinyl acetate comonomer content increased the absorption of phase change material.

Supercooling

The tendency to supercool of a PCM compositions obtained in the above section was measured in duplicate on an AQ20 differential scanning calorimeter from TA Instruments, according to ASTM D-3417, using samples weighting 8 mg.

The heating/cooling rate was 1° C./sec over an interval of from −20° C. to +60° C. with an integration range of from −10° C. to +35° C. The used correspond to the samples The tendency to supercool was quantified by the difference (ΔT) of the temperature at maximum of the melting temperature peak ($T_M$) minus the temperature at maximum of the crystallization temperature peak ($T_C$). The smaller the difference, the less supercooling there is.

In Table 2, sample 6 was prepared substantially the same as sample 1 except that 30 g of LLDPE and 30 g of renewably sourced PCM were used. The LLDPE was allowed to soak up the molten PCM for 6 hours at 80° C. and for another 4 hours at 115° C. in a Type IKA KA260 control shaker operating at a frequency of 5 Hz. Then, the tendency to supercool was measured by DSC.

Sample 7 was prepared substantially the same as sample 2 except that 30 g of ethylene vinyl acetate (ELVAX® 3120) pellets were mixed with 30 g of renewably sourced PCM. The ethylene vinyl acetate was allowed to soak up the molten phase change material for 6 hours at 65° C. and for another 6 hours at 80° C. in a Type IKA KA260 control shaker operating at a frequency of 5 Hz. Then, the tendency to supercool was measured by DSC.

Sample 8 was prepared substantially the same as sample 3 except that 30 g of ethylene vinyl acetate (ELVAX®3170) pellets were mixed with 30 g of renewably sourced PCM. The ethylene vinyl acetate was allowed to soak up the molten phase change material for 6 hours at 65° C. and for another 6 hours at 80° C. in a Type IKA KA260 control shaker operating at a frequency of 5 Hz. Then, the tendency to supercool was measured by DSC.

Sample 9 was prepared substantially the same as sample 4 except that 30 g of ethylene vinyl acetate (ELVAX® 265) pellets were mixed with 30 g of renewably sourced PCM. The ethylene vinyl acetate was allowed to soak up the molten phase change material for 6 hours at 65° C. and for another 6 hours at 80° C. in a Type IKA KA260 control shaker operating at a frequency of 5 Hz. Then, the tendency to supercool was measured by DSC.

Sample 10 was prepared substantially the same as sample 5 except that 36 g of ethylene vinyl acetate (ELVAX® 40L3) pellets were mixed with 24 g of renewably sourced PCM. The ethylene vinyl acetate was allowed to soak up the molten phase change material for 6 hours at 65° C. and for another 6 hours at 80° C. in a Type IKA KA260 control shaker operating at a frequency of 5 Hz. Then, the tendency to supercool was measured by DSC.

TABLE 2

| Sample | 6 (Comparative) | 7 | 8 | 9 | 10 |
|---|---|---|---|---|---|
| Vinyl Acetate (%) | 0 | 7.5 | 18 | 28 | 40 |
| $T_m$-$T_c$ | 19.9 | 16.8 | 17.4 | 14.4 | 5.7 |

Table 2 shows that increasing vinyl acetate comonomer contents significantly reduced the tendency of the phase change material to supercool.

The invention claimed is:

1. A composition comprising or produced from a blend of a phase change material (PCM) and at least one ethylene copolymer wherein
the PCM is selected from the group consisting of alkane, fatty acid, fatty alcohol, fatty acid ester, fatty acid amide, salts of fatty acid, and combinations of two or more thereof; and
the ethylene copolymer comprises or is produced from repeat units derived from ethylene and, based on the weight of the ethylene copolymer, from 30 wt % to 60 wt %, of at least one polar comonomer selected from the group consisting of vinyl acetate, acrylic acid, methacrylic acid, acrylic acid ester, methacrylic acid ester, carbon monoxide, and combinations of two or more thereof.

2. The composition of claim 1 wherein
the PCM is selected from the group consisting of fatty acid, fatty alcohol, fatty acid ester, fatty acid amide, salts of fatty acid, and combinations of two or more thereof; and
the ethylene copolymer is ethylene vinyl acetate copolymer, ethylene/(meth)acrylate copolymers, ethylene/alkyl (meth)acrylate copolymers, ethylene/(meth)acrylic acid copolymers, ethylene/vinyl acetate/CO terpolymer, ethylene/acrylic ester/CO terpolymer, and combinations of two or more thereof.

3. The composition of claim 2 wherein
the PCM is fatty acid or fatty acid derivative; the fatty acid is oleic acid, palmitic acid, linoleic acid, palmitoleic acid, stearic acid, or combinations of two or more thereof; the fatty acid derivative is monoglyceride, diglyceride, or triglyceride, fatty alcohol, fatty amide, or combinations thereof.

4. The composition of claim 3 wherein the PCM is derived from pork tallow, beef tallow, poultry fat, soybean oil, rapeseed oil, peanut oil, vegetable oil, yellow grease, or combinations of two or more thereof.

5. The composition of claim 4 wherein the ethylene copolymer is ethylene vinyl acetate copolymer; and
the composition additionally comprises from 0.01 to 15 weight % of an additive including plasticizer, stabilizer, UV absorber, anti-static agent, dye, pigment, inorganic filler, fire-retardant, lubricant, glass fiber, glass flake, synthetic fiber or pulp, foaming or blowing agent, processing aid, slip additive, antiblock agent, release agent, tackifying resin, or combinations of two or more thereof; and the stabilizer is viscosity stabilizer, hydrolytic stabilizer, or antioxidants.

6. The composition of claim 5 wherein the composition further comprising one or more flame retardant polymer composition, plaster, rock-wool insulation, glass-wool insulation, or foamed polystyrene.

7. A process comprising applying a composition or an article to a substrate wherein the article comprises the composition; the composition is as recited in claim 2; and the substrate is particle board, chip board, oriented strand board, plywood paneling, gypsum board, fiber reinforced gypsum board, fiber board, cement board, cementitious wood wool board, calcium silica board, fiber insulation batt or slab, foam insulation slab, nonwoven textile, fiber-reinforced cellulose, paper, cloth, metallic or non-metallic foil, or combinations of two or more thereof.

8. The process of claim 7 wherein the substrate is applied to a building.

9. The process of claim 8 wherein the process applies the composition to the substrate.

10. The process of claim 8 wherein the process applies the article to the substrate.

11. An article comprising or produced from a composition wherein the article is film or sheet; the article is a single layer or multilayer structure; and the composition is as characterized in claim 1.

12. The article of claim 11 wherein
the PCM is fatty acid or fatty acid derivative; the fatty acid is oleic acid, palmitic acid, linoleic acid, palmitoleic acid, stearic acid, or combinations of two or more thereof; the fatty acid derivative is monoglyceride, diglyceride, or triglyceride, fatty alcohol, fatty amide, or combinations thereof.

13. The composition of claim 12 wherein the PCM is derived from pork tallow, beef tallow, poultry fat, soybean oil, rapeseed oil, peanut oil, vegetable oil, yellow grease, or combinations of two or more thereof.

14. The article of claim 13 wherein the ethylene copolymer is ethylene vinyl acetate copolymer.

15. The article of claim 11 wherein
the article is a multilayer structure comprising a first layer and a second layer;
the first layer comprises or is produced from the composition;
the PCM is fatty acid or fatty acid derivative; the fatty acid is oleic acid, palmitic acid, linoleic acid, palmitoleic acid, stearic acid, or combinations of two or more thereof; the fatty acid derivative is monoglyceride, diglyceride, or triglyceride, fatty alcohol, fatty amide, or combinations thereof;
the ethylene copolymer comprises from 30 wt % to 60 wt % of the polar comonomer; and
the second layer is a metal layer or a metallized film layer.

16. The article of claim 15 wherein the first layer is in direct contact with the second layer.

17. The article of claim 16 further comprising a substrate having coated, laminated, adhered, or applied thereon the article; and the substrate is particle board, chip board, oriented strand board, plywood paneling, gypsum board, fiber reinforced gypsum board, fiber board, cement board, cementitious wood wool board, calcium silica board, fiber insulation batt or slab, foam insulation slab, nonwoven textile, fiber-reinforced cellulose, paper, cloth, metallic or non-metallic foil, or combinations of two or more thereof.

18. The article of claim 16 further comprising at least one retardant polymer composition, plaster, rock-wool insulation, glass-wool insulation or foamed polystyrene.

19. The article of claim 15 wherein the metal is aluminum and the film of the metallized layer is polyethylene terephthalate, polypropylene terephthalate, polybutylene terephthalate, polypropylene, polyethylene, oriented polypropylene, oriented polyethylene terephthalate, paper, or paperboard.

20. The article of claim 11 further comprising a substrate having coated, laminated, adhered, or applied thereon the composition; and the substrate is particle board, chip board, oriented strand board, plywood paneling, gypsum board, fiber reinforced gypsum board, fiber board, cement board, cementitious wood wool board, calcium silica board, fiber insulation batt or slab, foam insulation slab, nonwoven textile, fiber-reinforced cellulose, paper, cloth, metallic or non-metallic foil, or combinations of two or more thereof.

* * * * *